Patented Sept. 23, 1941

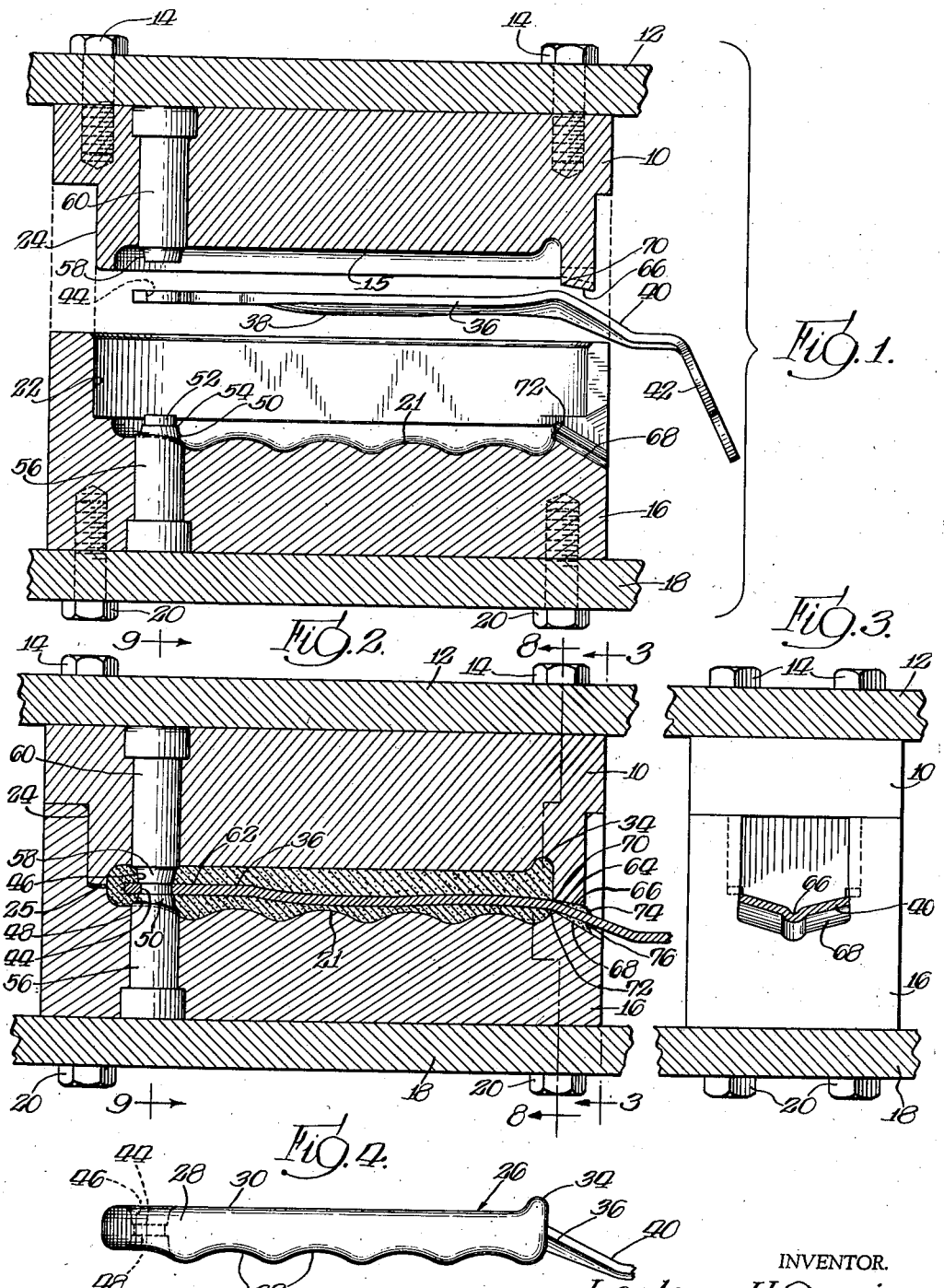

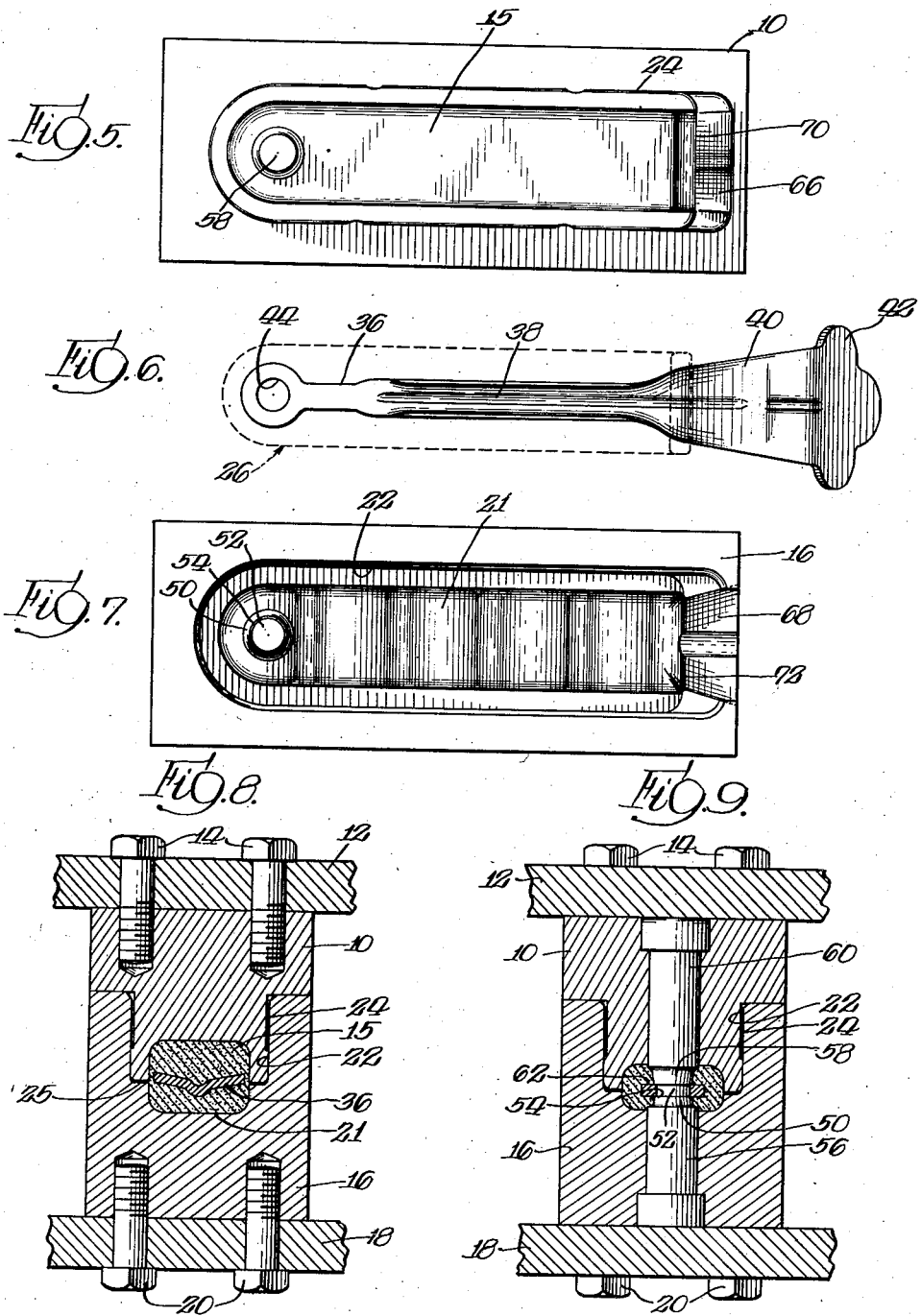

2,256,769

UNITED STATES PATENT OFFICE 2,256,769

METHOD AND APPARATUS FOR MOLDING PLASTIC OBJECTS

Leclare H. Amrine, Chicago, Ill., assignor to Imperial Molded Products Corporation, Chicago, Ill., a corporation of Illinois Application October 10, 1938, Serial No. 234,209

6 Claims. (Cl. 18—36)

My invention relates to the molding of plastic objects and particularly objects molded from phenolic and urea resinous materials, or materials of a similar character necessitating the application of great pressure and temperature during the formation of the object.

One of the objects of my invention is the provision of an apparatus for molding a plastic object which is provided with a reenforcing core.

Another object is the provision of an apparatus for molding a plastic object provided with a reenforcing core wherein an aperture is formed extending through the molded material and the core.

Still another object is the provision of an apparatus for molding a plastic object provided with a reenforcing core which protrudes outward from one side of the object and which utilizes a novel means for securely positioning the core within the object so that it will not be dislodged or expelled outward therefrom during the application of pressure in the molding operation.

A further object is the provision of an apparatus for forming an apertured molded object provided with a corresponding apertured reenforcing core which utilizes the provision of means in the molding device extending through the aperture of the core so that none of the molding material will be compressed within the aperture in the core during the molding operation, thereby preventing damage to the mold and preserving the proper design and shape of all parts of the molded object.

A still further object is the provision of an apparatus for molding a plastic object which is provided with a reenforcing core extending outward from one side thereof which utilizes a sharp cut off in the mold for sharply defining the edge of the object at the point where the core protrudes and which further utilizes the provision of an enlarged space in the passage through which the core extends outward so that surplus material expelled from the mold during the molding process may not be embedded into the exposed portion of the core thereby saving the operation of grinding away excess molded material which might otherwise be stuck to the exposed portion of the core.

With these and other objects in view, my invention consists in the construction, arrangement and combinations of the various parts of my apparatus, whereby the objects contemplated are attained, as hereinafter more fully set forth, pointed out in my claims, and illustrated in the accompanying drawings, in which:

Figure 1 is an exploded longitudinal sectional view of the molding apparatus showing upper and lower sections of a mold with a section of the core positioned between them.

Figure 2 is a longitudinal section of the mold in closed position showing the object at completion of the molding process.

Figure 3 is a sectional view taken on the line 3—3 of Figure 2.

Figure 4 is a side elevation of the molded object.

Figure 5 is a view looking into the upper section of the mold.

Figure 6 is a top view of the reenforcing core showing its position in the molded object.

Figure 7 is a top view of the lower section of the mold.

Figure 8 is a cross sectional view taken on the line 8—8 of Figure 2.

Figure 9 is a cross sectional view taken on the line 9—9 of Figure 2.

In molding plastic objects particularly of the sort made from phenolic and urea resinous compounds it is necessary to form the materials under an extremely high pressure accompanied by a correspondingly high temperature. While the method of forming the plastic materials themselves into any of a variety of forms is not new and is reasonably well known, the method of forming such materials into various shapes which have incorporated in them a metallic or other rigid core presents difficulties which are not met in ordinary molding problems.

Difficulties ordinarily resulting in the inclusion of a metallic core in such an object are increased when a portion of that core protrudes outward from one side or another of the object and must at the same time be securely positioned in a designated spot.

The proposed apparatus contemplates the formation of a utensil handle of plastic material of the sort above described which has incorporated therein a metallic core which extends outward from one end for attachment to a cooking utensil. The metallic core extends substantially throughout the entire length of the handle and near the opposite end there is designed to be provided an aperture extending through both the plastic material and the core to supply a reenforcing means for hanging a utensil to which the handle might be attached.

Experience has shown that in placing a metallic core within such an object pressure which is applied sets up a force which tends to push the core a short distance outward from the mold thereby displacing it substantially from its desired position. If the object is to be precisely made some means must be provided for securely positioning the core within the mold during the molding process.

Furthermore, where the molding sections close about the protruding portion of the core there is a tendency for surplus plastic material to be expelled and in ordinary molding devices this surplus material is pressed into the exposed portion of the core and after the object is withdrawn the surplus material must be ground, milled, or otherwise scraped from the core by exercise of considerable additional labor.

The apparatus herein disclosed has provided a means for relieving the mold at the point where the core protrudes therefrom so that any surplus material which is expelled will not be compressed into the surface of the core at this point.

As shown in the drawings, the apparatus comprises an upper mold section 10 secured customarily to a platen 12 by means of machine screws 14. In the upper mold section there is provided a recess 15 which forms the upper complementary portion of the mold cavity. Cooperating with the upper mold section is a lower mold section 16 secured to a lower platen 18 by machine screws 20 which likewise has provided therein a recess 21 forming the lower complementary portion of the mold cavity. The lower mold section 16 has moreover provided therein an additional well 22 within which a reduced portion 24 of the upper mold section is designed to be snugly inserted. Any surplus molding material may be allowed to escape at the horizontal edges at the dividing line of the mold during the molding process, as indicated by the reference numeral 24 in Figure 2.

The particular embodiment here shown is designed for the formation of a cored object 26 which consists of a plastic handle 28 having a smooth upper surface 30, finger depressions 32 on the underside and an upward extending lip 34 at the front edge serving as a thumb guard. Inside the plastic handle there is positioned a metallic core 36 which extends substantially the full length of the handle wherein it is bent forming a longitudinal reenforcing rib 38 to increase the strength of the resulting handle. The outer or protruding end of the core 40 extends downward at 42 to supply a surface which may be attached to any of a variety of cooking utensils. It is likewise to be noted that the metallic core 36 is provided with an aperture 44 at the opposite end which coincides with corresponding apertures 46 and 48 on the upper and lower sides of the plastic portion of the handle respectively.

It will be noted that the aperture 44 in the core is slightly smaller than the adjacent apertures in the plastic part so that when the device is hung there will be no chipping off or strain upon the somewhat brittle plastic material.

In order to properly position the metallic core in the mold during a molding process there is provided in the lower mold section an anchoring lug 50 which has an upward extending cylindrical portion 52 slightly smaller in diameter forming thereby a shoulder portion 54 separating the two parts. The anchoring lug 50 has a shank 56 extending downward through the lower mold section so that the lug is available for adjustment or removal should occasion require.

In the upper mold section there is a corresponding retaining lug 58 having a diameter in the embodiment shown greater than the cylindrical portion 52 and substantially equal to the part below the shoulder 54 in the anchoring lug. The retaining lug likewise is secured by a shank 60 extending through the upper mold section so that it, too, may be removed and replaced when necessary.

As here shown the cylindrical portion 52 has a length substantially equal to the thickness of the apertured portion of the metallic core so that when the core is fitted into the lower mold section the upper surface of the cylinder will be approximately flush with the upwardly positioned surface 62 of the metallic core as best seen in Figures 2 and 9.

At the right hand end of the mold there is a passage 64 when the mold is closed formed by what may be termed a channel 66 formed by the upper mold section and a complementary channel 68 in the lower mold section. The passage is roughly wedge shaped terminating at its inner end in an area of reduced cross section equal to the area of a cross section of the metallic core at this point. The inner end of the passage is defined by what may be termed a knife edge 70 on the upper mold section and a complementary knife edge 72 on the lower mold section. It will be particularly noted that from this narrowest dimension the passage 64 spreads as it extends toward the outer surface of the mold so that the surfaces of the corresponding channels retreat from the adjacent surface of the protruding portion of the metallic core.

*Operation*

When it is desired to mold a handle of the type described the lower mold section is mounted upright upon a platen and the metallic core placed within the mold cavity in the position shown in Figure 2. In this position the inner end of the core is positioned upon the anchoring lug 50 so that it rests upon the shoulder 54 while the outer end rests on the lower knife edge 72. There is provided by reason of the retreating direction of the channel 68 a narrow space between the mold and the core at the right of the knife edge. The positioning of the core upon the anchoring lug at one end and the knife edge at the other end securely fastens it within the mold cavity.

Next the requisite quantity of powdered or similar material is deposited in the mold cavity and the upper mold section is lowered into place. When the upper mold section has been lowered into proper position it will appear as shown in Figure 2 with the face of retaining lug 58 positioned flush with the upper surface of the cylindrical portion 52 of the anchoring lug. At the other end, to the right as viewed in Figures 1 and 2, the knife edge 70 is brought into contact with the adjacent upper surface of the metallic core at the point where it protrudes from the handle grip forming an effective dam to substantially prevent the expulsion of any of the plastic material at this point. Here again the channel 64 by reason of retreating from the adjacent portion of the metallic core provides a space of increasing dimension as it progresses toward the outer surface of the mold body.

When mold sections are thus engaged a tremendous pressure is applied through the platens pressing the sections together, and, assisted by a high temperature, the powdered or similar material becomes a homogeneous mass and becomes molded solidly around the metallic core. During this process by reason of the fact that the retaining lug 58 is pressed substantially flush with the cylindrical portion 52 of the anchoring lug at a surface outside the aperture in the core, none of the plastic material is compressed into the space within the core aperture leaving it therefore substantially clean and preventing distortion of it such as might result if a slug of the molding material were imprisoned within the aperture of the metallic portion. With the structure here shown any plastic material which might be deposited between the surfaces of the lugs would be squeezed laterally outward therefrom and become part of the adjacent portion of the handle.

In order to make a clean mold such that every portion of the cavity is filled it is the custom to deposit a slight excess of the plastic material into the cavity. As pressure is applied this slight excess must be expelled. Some of it is spread laterally as a fin identified by the reference numeral 25 between adjacent surfaces of the molding sections. Another small quantity will be expelled between the knife edges 70 and 72 and the adjacent surface of the core and flow outward through the passage 64 defined by the channels 66 and 68 forming somewhat wedge shaped fins 74 and 76. By reason of the fact that the passage spreads in an outward direction such excess plastic material as is expelled at this point is allowed to expand and flow freely outward. As pressure is continued to be applied to the mold sections the knife edges bite into the metallic core and eventually seal the opening from any further expulsion of plastic material. By reason of the fact, however, that no mold pressure is exerted upon the fins 74 and 76, at a point outside the position of the knife edges, the plastic material which is expelled is not pressed into the protruding portion of the core. Therefore, when the mold is broken open any fin which may be formed at this exposed portion of the core may be readily broken away with a knife blade or with the fingers and the labor of trimming reduced to a minimum.

By a provision of a mold of this sort the customary grinding which would be necessary if the surplus plastic material were embedded by pressure into the protruding portion of the core is eliminated at a corresponding saving of expense.

Likewise, when the core is broken open the retaining lug 58 by reason of being bevelled slightly at the base as shown is easily extracted from the molded object leaving an impression of the upper portion of the aperture. Thereafter, the molded object is readily removed from the lower anchoring plug which when extracted completes the formation of an aperture through both the molded portion of the handle and the core.

There has thus been provided method and apparatus for economically forming a plastic handle device provided with a metallic core positioned therein so as to substantially reenforce it and provide simultaneously a reenforced aperture to permit hanging by a hook or some similar means. By operation of the method shown the labor of trimming and cleaning the molded object is reduced to a minimum and a molded object of substantial and economic construction results.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A pressure molding device for forming an apertured object of plastic material provided with a correspondingly apertured reenforcing core protruding outwardly from one side thereof comprising upper and lower mold sections each provided with complementary recesses for forming a cavity corresponding to the outer dimension of the article to be molded, the walls of the cavity having complementary horizontal contacting edges, a substantially U-shaped recess in one end wall of each section positioned in face to face relation, the bight of each recess being inclined to form a knife edge at the inner end of each recess and a passage between said last mentioned walls diverging outwardly from said knife edges to the outer faces of said last mentioned walls when the mold is closed, whereby said knife edges snugly engage the protruding end of the core and form a cut-off for the molding material within the mold and said diverging passage provides a space between the walls and the protruding end of the core to substantially prevent pressing surplus molding material in said passage against the protruding end of the core, and a lug in the cavity spaced from said knife edges and anchored to one of said mold sections insertable in the aperture of said core to prevent shifting of the core in said passage when the molding pressure is applied.

2. A pressure molding device for forming a cored object of plastic material wherein the core protrudes outwardly from one side thereof comprising upper and lower mold sections each provided with complementary recesses having horizontal contacting edges forming a cavity corresponding to the object to be molded, a substantially U-shaped recess in one end wall of each section positioned in face to face relation forming a passage the bight of each recess being inclined to form a knife edge at the inner end of each recess and a passage between said last mentioned walls diverging outwardly from said knife edges to the outer faces of said last mentioned walls when the mold is closed, whereby said knife edges snugly engage the protruding end of the core and form a cut-off for the molding material within the mold and said diverging passage provides a space between the walls and the protruding end of the core to substantially eliminate the pressing of surplus plastic material in said passage against the protruding end of the core.

3. A pressure molding device for forming a cored object of plastic material wherein the core protrudes outwardly from one side thereof comprising upper and lower telescoping mold sections having portions adapted to be received one within the other each provided with complementary recesses having complementary horizontal opposed edges adapted to be urged into contact with each other forming a cavity corresponding to the object to be molded, a substantially U-shaped recess in one end wall of each section positioned in face to face relation, the bight of each recess being inclined to form a knife edge at the inner end of each recess and a passage between said last mentioned walls diverging outwardly from said knife edges to the outer faces of said last mentioned walls when the mold is closed, whereby said knife edges snugly engage the protruding end of the core and form a cut-off for the molding materials within the mold and said diverging passage provides a space between the walls and the protruding end of the core to substantially prevent pressing surplus material in the passage against the protruding end of the core when the molding pressure is applied.

4. A pressure molding device for forming an apertured object of plastic material provided with a reenforcing core having a corresponding aperture therein in substantial alignment with said first aperture comprising upper and lower mold sections having portions adapted to be received one within the other, each provided with complementary recesses forming a cavity corresponding to the object to be molded the walls of the cavity having complementary contacting edges, a substantially U-shaped recess in one end wall of each section positioned in face to face relation, the bight of each recess being inclined to form a knife edge at the inner end of each recess, an anchoring lug for the core secured to a mold section in one of said cavities spaced from said knife edges and having a portion adapted to be inserted within and extend substantially through the aperture in said core to a position wherein the end surface is in the same plane as the bottom of one of said core apertures and means thereon providing a support for the core at said core aperture, a retaining lug secured to the other mold section in the other of said cavities concentric with respect to the aperture adapted when the mold is closed to penetrate the object on the side opposite said anchoring lug to a position wherein the end surface is in the same plane as the bottom of said one core aperture and face to face with the end surface of said other lug thereby to exclude substantially all the material from the core aperture by pressure of one lug against the other at a point exterior of said core aperture, said lugs being operable thereby to hold the core in positive position while the molding pressure is applied.

5. A pressure molding device for forming an apertured object of plastic material provided with a reenforcing core having a corresponding aperture therein adjacent said first aperture comprising upper and lower mold sections having a telescoping fit one within the other, each provided with complementary recesses having complementary horizontal edges urged into contact when assembled forming a cavity corresponding to the object to be molded, an anchoring lug for the core secured to the mold section in one of said cavities spaced from said knife edges having a portion adapted to be inserted within and to extend substantially through the aperture in said core so that the end face of the lug is brought to a level clear of the metal surrounding said aperture and substantially in the plane of the contacting edges of said recesses, a shoulder on said lug for limiting said insertion of the lug and for supporting one end of said core, a retaining lug secured to the other mold section in the other of said cavities concentric with respect to the aperture having a diameter larger than said aperture adapted when the mold is closed to penetrate the object on the side opposite said anchoring lug and so that the end face of the retaining lug is brought face to face with the end face of said anchoring lug substantially in the plane of said horizontal edges thereby to exclude substantially all the material from the aperture at a point exterior with respect to the aperture in said core, said lugs being operable thereby to hold the core in positive position while the molding pressure is applied.

6. A pressure molding device for forming an apertured object of plastic material provided with a reenforcing core having a corresponding aperture and protruding outwardly from one side of the object comprising upper and lower telescoping mold sections having portions adapted to be received one within the other, each provided with complementary recesses forming a cavity corresponding to the object to be molded and a substantially U-shaped recess in one end wall of each section positioned in face to face relation, the bight of each recess being inclined to form a knife edge at the inner end of each recess adjacent the object for cutting off the plastic material and for supporting the core end opposite said apertured end, an anchoring lug for the core secured in one mold section in one of said cavities spaced from the knife edges and having a portion adapted to be inserted within and extend substantially through the aperture in said core so that the end lies in a plane on one side of said dividing line and a shoulder thereon in a plane on the other side of the dividing line for limiting said insertion of the lug and for supporting the apertured end of the core, a retaining lug secured to the other mold section in the other of said cavities concentric with respect to the aperture having a diameter larger than said aperture adapted when the mold is closed to penetrate the object on the side opposite said anchoring lug and exclude substantially all the material from the aperture formed thereby at a point exterior of the aperture in said core, said lugs having an anchoring engagement with the core while the molding pressure is applied.

LECLARE H. AMRINE.